US012429021B2

(12) United States Patent
Terry et al.

(10) Patent No.: US 12,429,021 B2
(45) Date of Patent: Sep. 30, 2025

(54) FUEL INJECTION THROTTLE BODY ASSEMBLY HAVING A FUEL DISTRIBUTION SLEEVE

(71) Applicant: Edelbrock, LLC, Olive Branch, MS (US)

(72) Inventors: Collin Scott Terry, Union City, TN (US); Hunter Stephen Pauloski, Millington, TN (US)

(73) Assignee: Edelbrock, LLC, Olive Branch, MS (US)

( * ) Notice: Subject to any disclaimer, the term of this patent is extended or adjusted under 35 U.S.C. 154(b) by 91 days.

(21) Appl. No.: 18/504,457

(22) Filed: Nov. 8, 2023

(65) Prior Publication Data

US 2025/0146463 A1 May 8, 2025

(51) Int. Cl.
*F02M 69/04* (2006.01)
*F02M 35/10* (2006.01)

(52) U.S. Cl.
CPC .... *F02M 69/043* (2013.01); *F02M 35/10216* (2013.01); *F02M 2200/28* (2013.01)

(58) Field of Classification Search
CPC ........... F02M 69/043; F02M 35/10216; F02M 2200/28
USPC ................ 123/470, 302, 308, 336, 337, 432
See application file for complete search history.

(56) References Cited

U.S. PATENT DOCUMENTS

| | | | |
|---|---|---|---|
| 4,966,735 | A | 10/1990 | LoRusso |
| 5,012,780 | A | 5/1991 | Bugamelli |
| 5,261,382 | A | 11/1993 | Nikolai |
| 5,386,145 | A | 1/1995 | Boswell |
| 5,807,512 | A | 9/1998 | Grant |
| 5,809,972 | A | 9/1998 | Grant |
| 5,863,470 | A | 1/1999 | Grant |
| 6,019,075 | A | 2/2000 | Galka et al. |
| 6,120,007 | A | 9/2000 | Grant |
| 7,634,983 | B2 | 12/2009 | Grant |
| 7,735,475 | B2 | 6/2010 | Farrell et al. |
| 9,115,671 | B2 | 8/2015 | Benoit |
| 9,303,578 | B2 | 4/2016 | Wittkopf et al. |
| 9,376,997 | B1 | 6/2016 | Farrell et al. |
| 9,482,198 | B1 | 11/2016 | Farrell et al. |
| 9,845,740 | B2 | 12/2017 | Wittkopf et al. |
| 9,869,278 | B2 * | 1/2018 | Schwark ............ F02M 21/0281 |
| 10,012,197 | B2 | 7/2018 | Flynn et al. |

(Continued)

*Primary Examiner* — Hai H Huynh

(74) *Attorney, Agent, or Firm* — Howard & Howard Attorneys PLLC

(57) ABSTRACT

A fuel injection throttle body assembly for an internal combustion engine and including a throttle body case defining a port. The fuel injection throttle body assembly further includes a fuel distribution sleeve disposed in the port and a throttle valve pivotably supported by the throttle body case and disposed in the port. The throttle valve is arranged between the fuel distribution sleeve and the outlet side of the throttle body case. The fuel distribution sleeve includes an annular body extending from a first sleeve end to a second sleeve end and has an inlet portion proximate the first sleeve end defining an inlet diameter, an outlet portion proximate the second sleeve end defining an outlet diameter, and a throat portion positioned between the inlet portion and the outlet portion defining a throat diameter, wherein the throat diameter is less than the inlet diameter and the outlet diameter.

25 Claims, 11 Drawing Sheets

(56) References Cited

U.S. PATENT DOCUMENTS

| | | | |
|---|---|---|---|
| D826,280 | S | 8/2018 | Koo et al. |
| 10,094,353 | B2 | 10/2018 | Bennett et al. |
| 10,100,798 | B2 | 10/2018 | Farrell et al. |
| 10,294,902 | B2 | 5/2019 | Shehan et al. |
| 10,570,866 | B2 | 2/2020 | Flynn et al. |
| 10,830,195 | B2 | 11/2020 | Shehan et al. |
| 10,859,004 | B2 | 12/2020 | Shehan et al. |
| 10,920,684 | B2 | 2/2021 | Bell et al. |
| 10,961,968 | B2 | 3/2021 | Farrell et al. |
| 11,118,515 | B2 | 9/2021 | Shehan et al. |
| 11,136,924 | B1 | 10/2021 | Koo |
| 11,220,984 | B2 | 1/2022 | Shehan et al. |
| 11,225,916 | B2 | 1/2022 | Shehan et al. |
| 11,333,083 | B2 | 5/2022 | Shehan et al. |
| 11,391,255 | B2 | 7/2022 | Farrell et al. |
| 11,493,010 | B2 | 11/2022 | Whittle |
| 11,674,458 | B1 | 6/2023 | Ma |
| 2011/0120413 | A1 | 5/2011 | Runia et al. |
| 2015/0010825 | A1 | 1/2015 | Yang et al. |
| 2023/0099976 | A1 | 3/2023 | Farrell et al. |

* cited by examiner

FUEL INJECTION THROTTLE BODY ASSEMBLY HAVING A FUEL DISTRIBUTION SLEEVE

BACKGROUND

In order to increase the efficiency, and consequently power and fuel economy, of internal combustion engines, carburetors have largely been replaced by fuel injection systems for controlling the flow of fuel into the engine. Electronic fuel injection (EFI), in particular, has the ability to precisely and accurately control the flow of fuel into the engine based on several parameters simultaneously. As the driver depresses a vehicle's accelerator pedal, an electronic control unit (ECU) calculates the amount of fuel required based on factors such as the accelerator pedal position, manifold pressure, air temperature, etc. and sends a signal to fuel injectors to spray a prescribed amount of fuel into the internal combustion engine's intake system to be used for the combustion reaction.

Consumers wishing to take advantage of the additional power and improved drivability that can be achieved from more efficient operation engines originally produced with carburetors may be retrofit with EFI systems. These engines are frequently installed in classic or antique vehicles where a "factory" or "period-correct" appearance is desired. As such, an EFI system that is capable of being retrofit to an engine with a minimum of replacement components is valuable. Some EFI systems may have fuel injectors located in individual intake runners, which would require replacement or modification of the intake manifold, which is both more complicated and more costly. A throttle body injection (TBI) system has the fuel injectors located in the throttle body assembly, which not only reduces the complexity and cost of retrofitting an older engine with EFI but also is aesthetically similar to the carburetor it is replacing.

Packaging the fuel injectors in the throttle body assembly for easy installation may result in placement and orientation of the fuel injectors that is less than ideal. Due to a variety of factors, this placement of the fuel injectors may cause sub-optimal fuel atomization and mixing of the fuel and air mixture. If the fuel and air mixture is not sufficiently mixed it may cause an overly lean and/or overly rich air fuel ratio in some or all of the engine's cylinders, which can reduce efficiency and, in some cases, damage the engine.

SUMMARY

The subject invention relates to a fuel injection throttle body assembly for an internal combustion engine. The fuel injection throttle body assembly comprises a throttle body case having an inlet side and an outlet side and defining a port having an inner surface extending from the inlet side to the outlet side. The inlet side is configured to receive air and the outlet side is configured to be coupled to the internal combustion engine. A fuel distribution sleeve is disposed in the port and comprises an annular body extending from a first sleeve end to a second sleeve end and having an inlet portion proximate the first sleeve end defining an inlet diameter, and an outlet portion proximate the second sleeve end defining an outlet diameter. The annular body further includes a throat portion positioned between the inlet portion and the outlet portion defining a throat diameter. The throat diameter is less than the inlet diameter and the outlet diameter. A plurality of fuel nozzles are defined in the annular body and are radially arranged proximate the second sleeve end. A throttle valve is pivotably supported by the throttle body case and disposed in the port. A portion of the throttle valve is arranged between the fuel distribution sleeve and the outlet side of the throttle body case.

The subject invention also relates to a fuel distribution sleeve for use in a throttle body assembly and configured to supply fuel ahead of a pivot axis of a throttle valve. The fuel distribution sleeve comprises an annular body extending from a first sleeve end to a second sleeve end and having an inlet portion proximate the first sleeve end defining an inlet diameter, and an outlet portion proximate the second sleeve end defining an outlet diameter. The annular body further has a throat portion positioned between the inlet portion and the outlet portion defining a throat diameter. The throat diameter is less than the inlet diameter and the outlet diameter. A plurality of fuel nozzles are defined in the outlet portion of the annular body spaced from the throat portion with the plurality of fuel nozzles radially arranged proximate the second sleeve end.

Any of the above aspects can be combined in full or in part. Any features of the above aspects can be combined in full or in part. Any of the above implementations for any aspect can be combined with any other aspect. Any of the above implementations can be combined with any other implementation whether for the same aspect or a different aspect.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
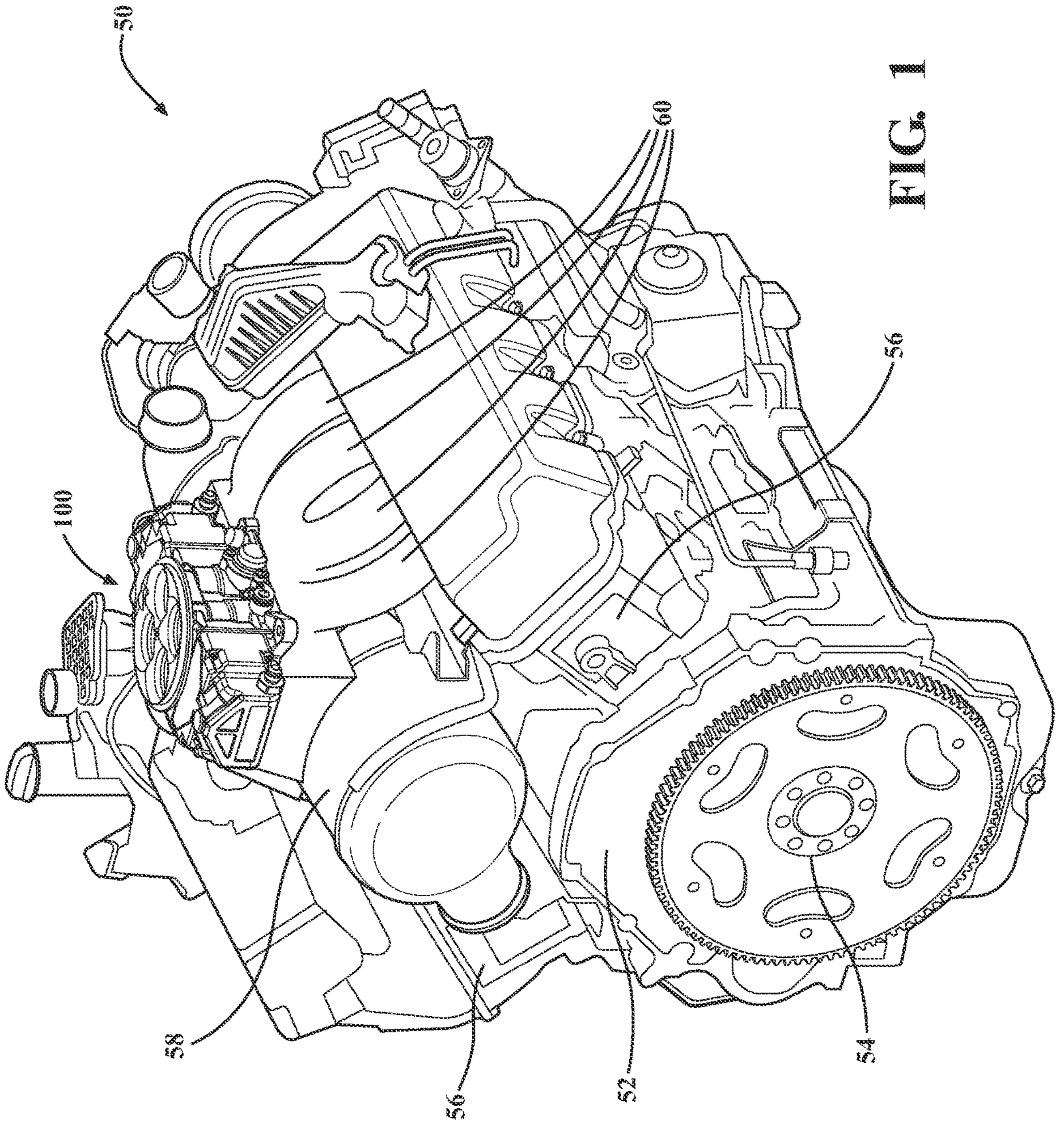
FIG. 1 is a perspective environmental view of a fuel injection throttle body assembly attached to an intake manifold of an internal combustion engine.

Referring to FIG. 1, an environmental view of an internal combustion engine 50 of the type typically used in a motor vehicle is shown. The internal combustion engine 50 shown here is an eight-cylinder (i.e., V8) configuration and includes a cylinder block 52 that defines the cylinders and houses a rotating assembly (not shown). The rotating assembly may include a crankshaft 54, connecting rods, and pistons. The cylinder block 52 may further house a camshaft (not shown). The internal combustion engine 50 further includes cylinder heads 56 coupled to the cylinder block 52, and an intake manifold 58 coupled to each of the cylinder heads 56. The cylinder heads 56 form a closed end of the cylinders to define a combustion chamber, in which a mixture of air and fuel are burned to force the pistons to reciprocate and turn the crankshaft 54. The fuel and air mixture is directed to the combustion chamber through an intake port and controlled by an intake valve that is operated by a valvetrain and camshaft. The intake manifold 58 includes several hollow intake runners 60, each of which is in fluid communication with one of the intake ports. A fuel injection throttle body assembly 100 is coupled to the intake manifold 58 to control the operation of the internal combustion engine 50 by controlling the flow of air into the intake manifold 58 and metering an appropriate amount of fuel to produce a mixture having the desired ratio of air and fuel.

The fuel injection throttle body assembly 100 includes a throttle body case 102 having an inlet side 104 and an outlet side 106. The inlet side 104 is configured to receive air, typically from an air cleaner or air filter (not shown) that may be secured to the throttle body assembly 100. The outlet side 106 is configured to be coupled to the internal combustion engine 50, and may include bosses 108 to receive fasteners that engage the intake manifold 58. More particularly, the outlet side 106 of the throttle body case 102 is coupled to the intake manifold 58 such that air received at the inlet side 104 is directed to the intake manifold 58 and the intake runners 60. To this end, the throttle body case 102 defines at least one port 110 having an inner surface 112 extending from the inlet side 104 to the outlet side 106 of the throttle body case 102. Here, the at least one port 110 is further defined as four ports 110, each having a corresponding inner surface 112. In other words, the throttle body case 102 defines four ports. Other configurations with differing quantities or arrangements of ports are contemplated, for example a pair of ports or a single port.

Figure 2:
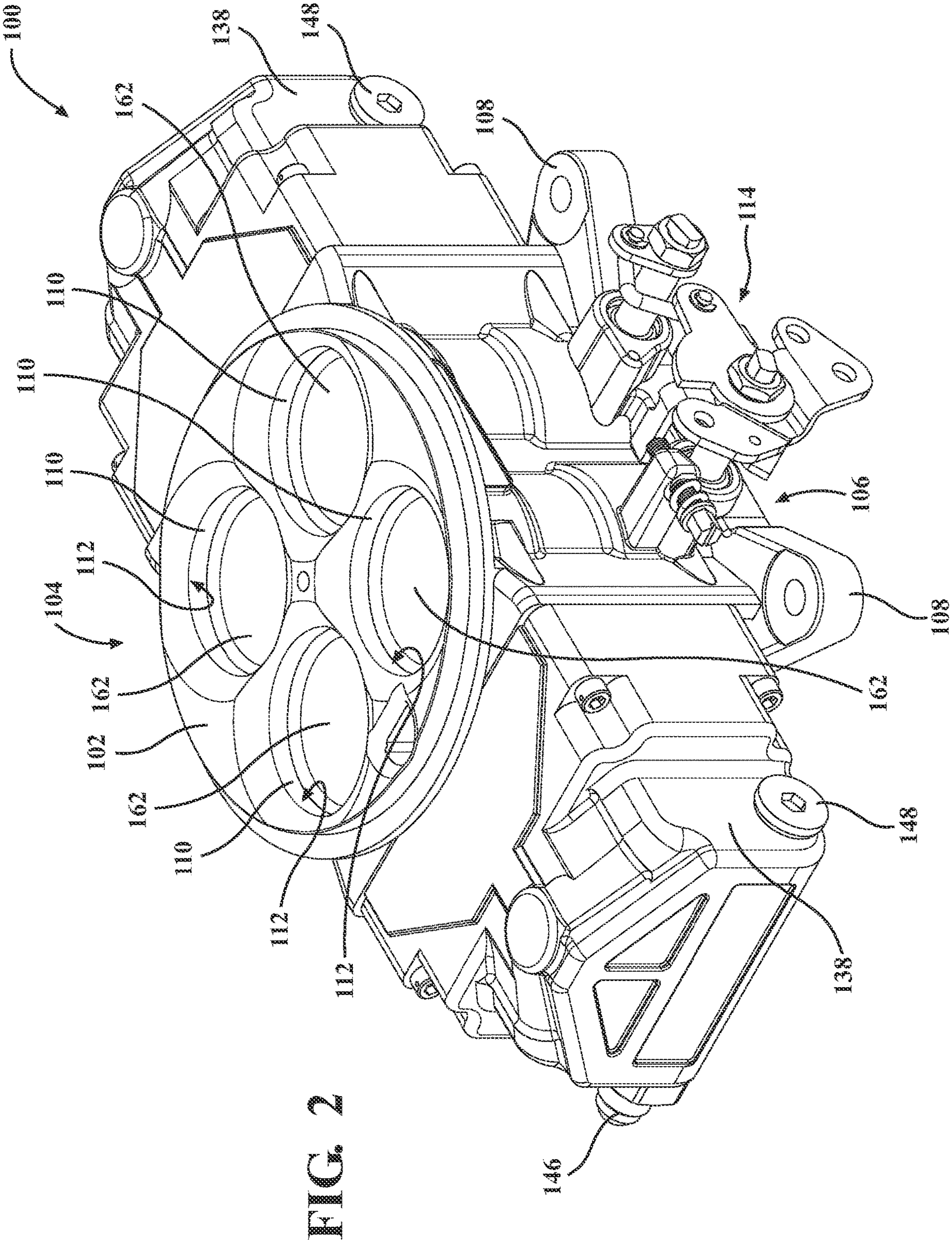
FIG. 2 is a perspective view of the fuel injection throttle body assembly of FIG. 1 showing a throttle body case defining four ports extending therethrough.
Figure 3:
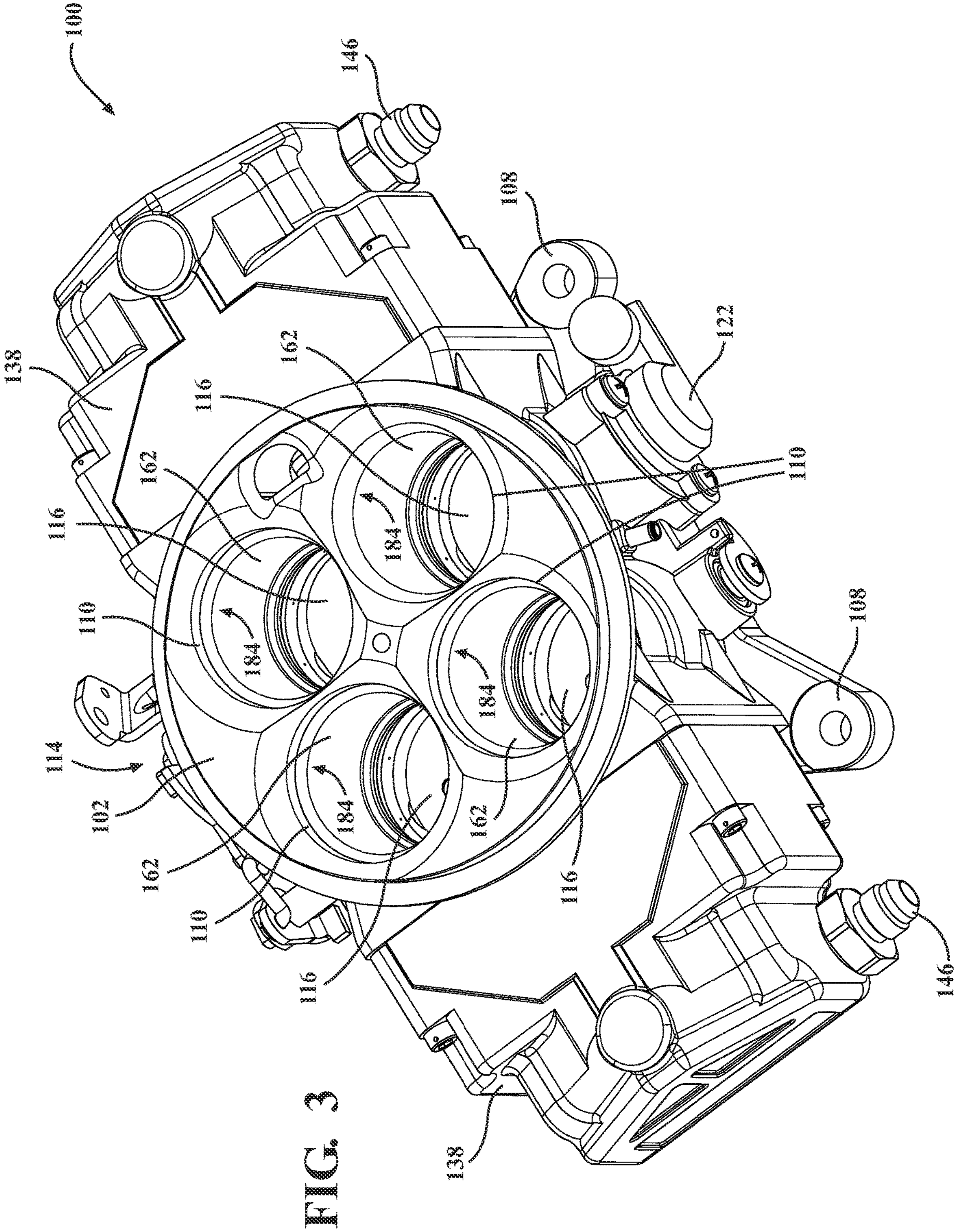
FIG. 3 is another perspective view of the fuel injection throttle body assembly of FIG. 1 showing a fuel distribution sleeve disposed in each of the ports.
Figure 7:
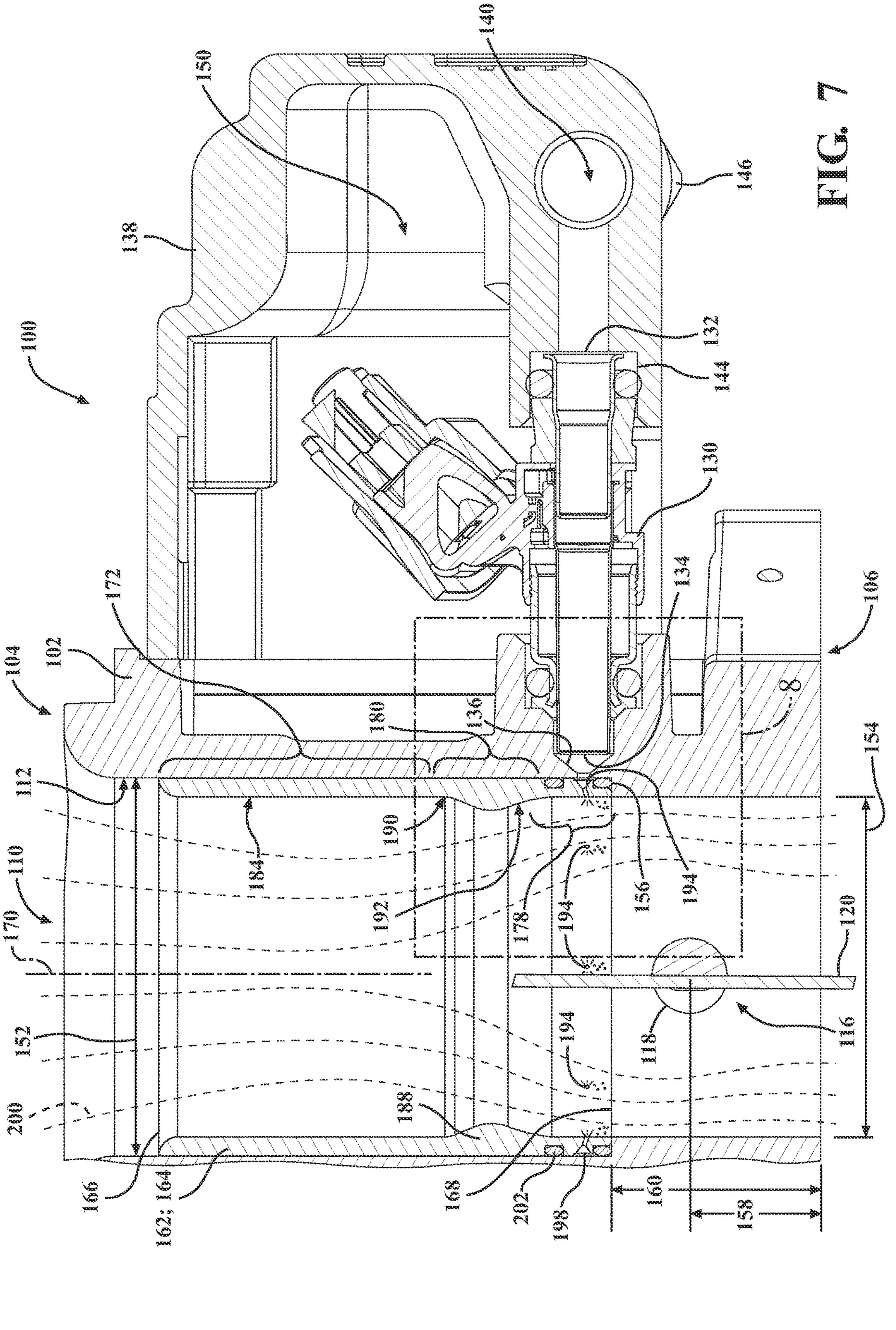
FIG. 7 is an enlarged cross-sectional view of a portion of the fuel injection throttle body assembly of FIG. 5 shown with a throttle valve in a fully open position.

The throttle body assembly 100 further includes a throttle linkage 114 coupled to at least one throttle valve 116, shown in FIGS. 2 and 3. The throttle linkage 114 is operatively coupled to one end of a throttle cable or additional linkage (not shown), the other end of which is coupled to an accelerator pedal (not shown) and operable by a driver. The throttle valve 116 is pivotably supported by the throttle body case 102 and disposed in the port 110. Here, each of the ports 110 of the throttle body assembly 100 includes a corresponding throttle valve 116. As mentioned above, the throttle valve 116 is coupled to the throttle linkage 114 to effect pivoting movement of the throttle valve 116 within the port 110. To this end, the throttle valve 116 comprises a shaft 118 and a throttle plate 120 coupled to the shaft 118. The throttle linkage 114 is coupled to one end of the shaft 118, which extends through the throttle body case 102 and port 110. The driver is able to actuate the accelerator pedal, the motion of which is transferred to the throttle linkage 114 via the throttle cable. Motion of the throttle cable pivots the throttle linkage 114, the shaft 118, and the throttle plate 120 to move the throttle valve 116 between a closed position (FIG. 5) and a fully open position (FIG. 7). Here, the throttle linkage 114 is coupled to the throttle valve 116 for each port 110 to open each throttle valve 116 and time the pivoting motion of each shaft 118.

Figure 4:
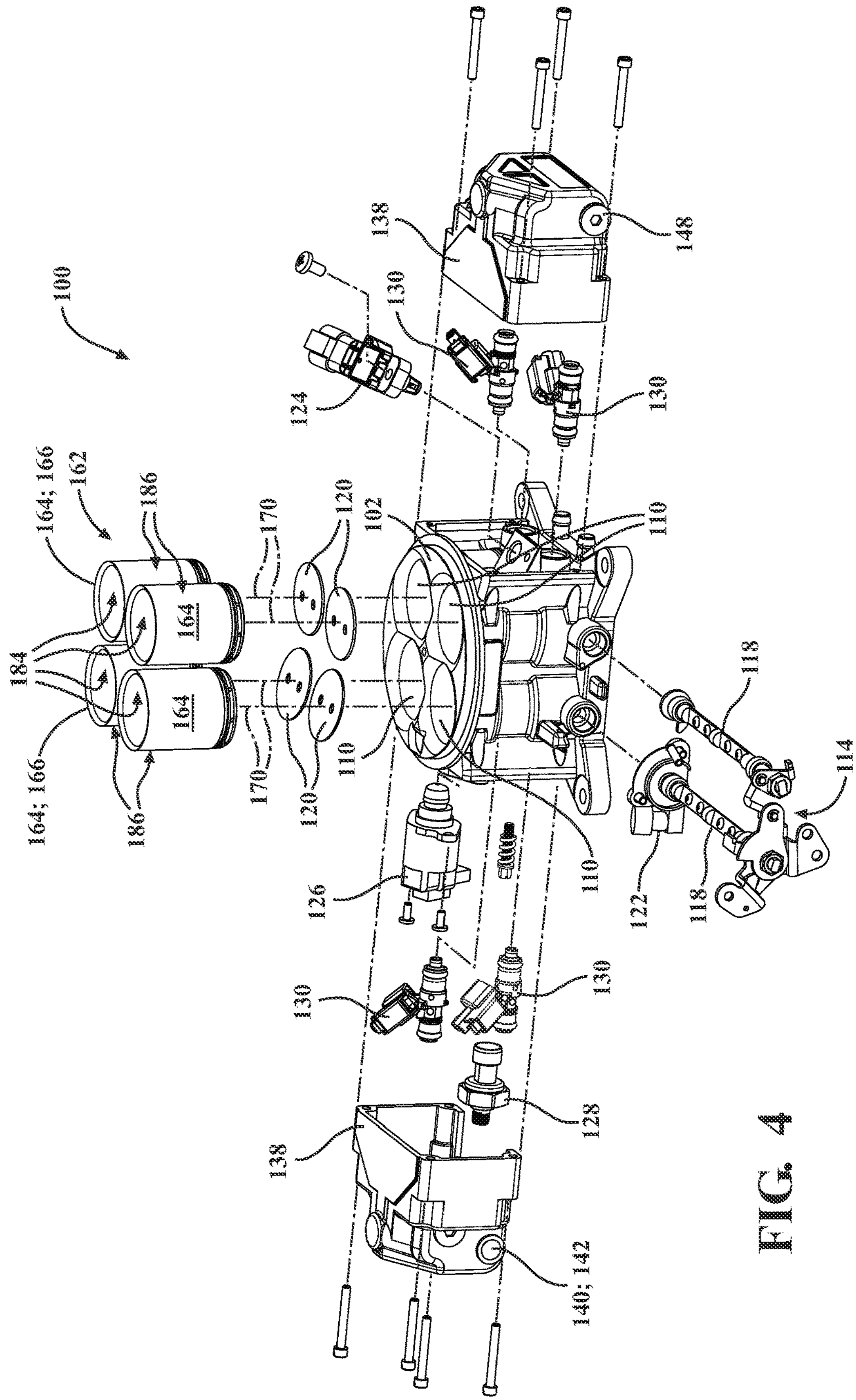
FIG. 4 is an exploded view of the fuel injection throttle body assembly showing the fuel distribution sleeves, injector covers, and fuel injectors spaced from the throttle body case.

Best shown in FIGS. 3 and 4, the throttle body assembly 100 may further include a throttle position sensor (TPS) 122. The TPS 122 is supported on the throttle body case 102 and operatively engaged with one of the shafts 118 to determine the rotational position. The TPS 122, which is in electrical communication with an engine control unit (ECU), cooperates with the ECU to generate an electrical signal corresponding to the position of the throttle valve 116 as the throttle valve 116 moves between the closed position and the fully open position. The signal generated by the TPS 122 is used by the ECU to control operation of the internal combustion engine 50. In addition to the TPS 122, the additional electronics may be included with the throttle body assembly 100 and in communication with the ECU. Here, the throttle body assembly 100 may include a manifold air pressure (MAP) sensor 124 that generates a signal corresponding to the pressure (or vacuum, as the case may be) of air within the intake manifold 58. Additionally, the throttle body assembly 100 may include an idle air control (IAC) valve 126 that receives a signal from the ECU to allow a small amount of air into the intake manifold 58 to facilitate smooth operation of the internal combustion engine 50 at low speeds (i.e., idling). Lastly, the throttle body assembly 100 may include a fuel pressure sensor 128 that generates a signal corresponding to the pressure of fuel supplied to the throttle body assembly 100, as will be discussed in further detail below.

With continued reference to FIGS. 3 and 4, the throttle body assembly 100 may further include one or more fuel injectors 130 each having an injector inlet 132 and an injector outlet 134 engaged with the throttle body case 102. Each of the fuel injectors 130 is in fluid communication with one of the ports 110 via a fuel passage 136 defined in the inner surface 112 of the corresponding port 110. Said differently, the inner surface 112 of the port 110 defines a fuel passage 136 extending through a portion of the throttle body case 102 that facilitates fluid communication between the fuel injector 130 and the port 110.

Likewise, the throttle body assembly 100 may further include one or more injector covers 138. As shown here, the throttle body assembly 100 includes two injector covers 138 coupled to opposing sides of the throttle body case 102. Each of the injector covers 138 are engaged with the injector inlet 132 of one or more of the fuel injectors 130 to direct fuel supplied by the vehicle's fuel system to the injectors 130. To this end, the injector cover 138 defines a fuel gallery 140, best shown in FIGS. 5, 6, 13, and 14. The fuel gallery 140 includes at least one gallery adapter 142 and at least one injector mount 144. Here, the injector cover 138 is configured with a fuel gallery 140 having three gallery adapters 142 and two injector mounts 144.

The gallery adapters 142 may be realized as threaded ports configured to receive a fuel fitting. Exemplary fuel fittings illustrated herein include an AN fitting 146 and a plug 148. The AN fitting 146 is a threaded flange fitting to which a hose or tube of the vehicle's fuel system can be secured. Similarly, the plug 148 may be inserted into the gallery adapter 142 to block the fuel gallery 140 and created a closed end. In one implementation, the two gallery adapters 142 may be arranged on opposing sides of the injector cover 138. As shown here, one gallery adapter 142 is configured with the AN fitting 146 and the other gallery adapter 142 is configured with the plug 148. It is to be appreciated that either gallery adapter 142 can receive the AN fitting 146 or the plug 148. More particularly, when the throttle body assembly 100 is coupled to the internal combustion engine 50, the injector cover 138 may be configured with the AN fitting 146 on either the left side of the internal combustion engine 50 or the right side of the internal combustion engine 50 to accommodate installation in a variety of vehicles with differently configured fuel systems. The plug 148 is generally arranged in the gallery adapter 142 opposite the AN fitting 146. The third gallery adapter 142 may be arranged in an interior 150 of the injector cover 138, as shown in FIGS. 6 and 12-14. The fuel pressure sensor 128 may be received in the third gallery adapter 142 to measure the fuel pressure in the fuel gallery 140. Other implementations and arrangements are contemplated to accommodate installation in a larger variety of vehicles including different fittings.

The injector mounts 144 are arranged in the interior 150 of the injector cover 138 and configured to receive the injector inlet 132 of the fuel injector 130. As mentioned above, the injector outlet 134 is received in the fuel passage 136 and, as such, when the injector inlet 132 is received in the injector mount 144 the fuel injector 130 is arranged between the throttle body case 102 and the injector cover 138. The injector cover 138 is coupled to the throttle body case 102 with the fuel injector 130 disposed therebetween. In other words, fuel injector 130 is sandwiched between the injector cover 138 and the throttle body case 102, and when the injector cover 138 is secured to the throttle body case 102 the fuel injector 130 cannot be removed.

Figure 5:
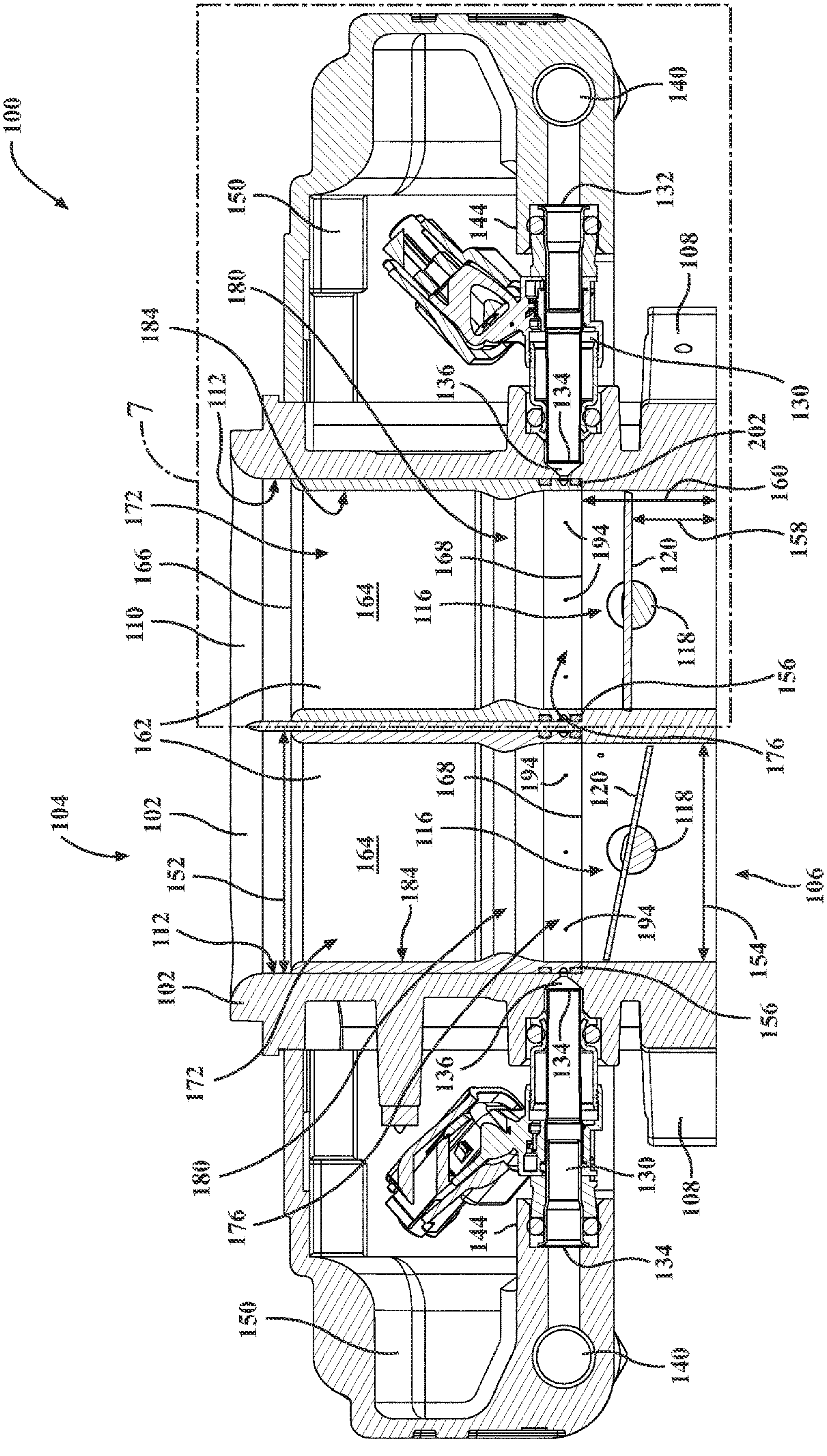
FIG. 5 is a cross-sectional view of the fuel injection throttle body assembly.
Figure 6:
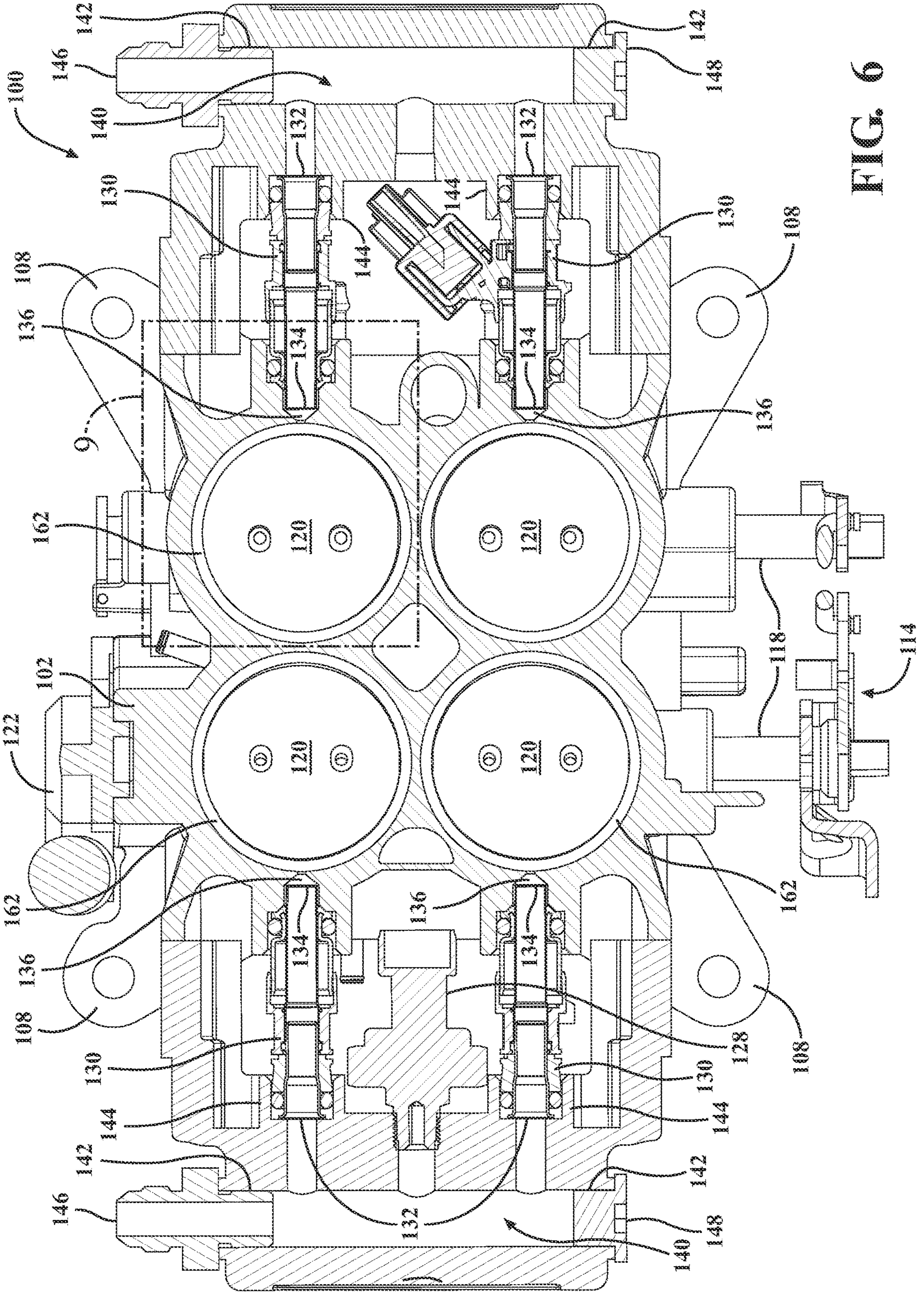
FIG. 6 is another cross-sectional view of the fuel injection throttle body assembly.
Figure 8:
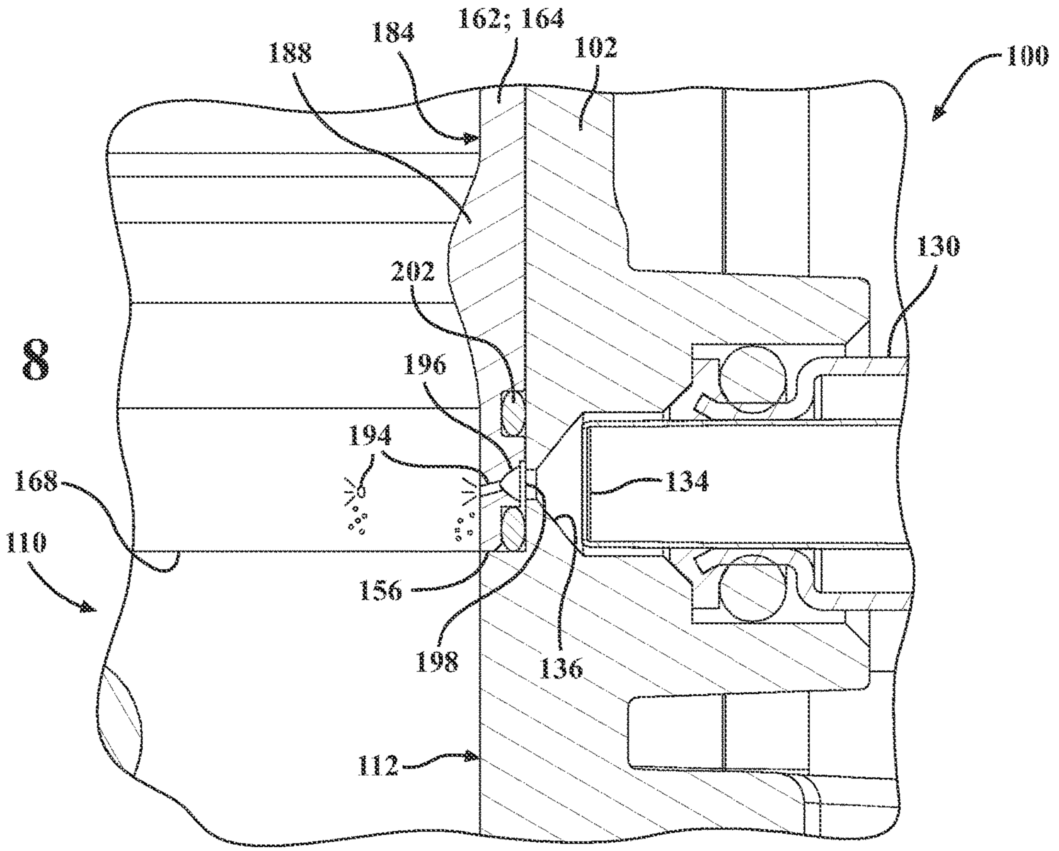
FIG. 8 is a further enlarged cross-sectional view of a portion of the fuel injection throttle body assembly of FIG. 7.

Turning now to FIGS. 5, 7, and 8, internal details and structures of the throttle body assembly 100 are shown. In particular, the internal shape of the port 110 is illustrated. The port 110 defines a first port diameter 152 proximate to the inlet side 104 of the throttle body case 102 and a second port diameter 154 proximate to the outlet side 106 of the throttle body case 102. As mentioned above, the implementation of the throttle body assembly 100 illustrated herein is configured with four ports 110, each of the four ports 110 having equal first port diameters 152 and further having equal second port diameters 154. Said differently, each of the four ports 110 has the same configuration. To this end the port 110 (or ports 110) includes a shelf 156, the shelf 156 defining the first port diameter 152 and the second port diameter 154, wherein the first port diameter 152 is greater than the second port diameter 154. Said differently, the port 110 is larger on the inlet side 104 of the throttle body case 102 than on the outlet side 106 of the throttle body case 102. The shelf 156 is arranged in the port 110 between the throttle valve 116 and the inlet side 104 of the throttle body case 102. Said differently, the throttle valve 116 may be arranged at a first height 158 relative to the outlet side 106 of the throttle body case 102 and the shelf 156 may be arranged at a second height 160 relative to the outlet side 106 of the throttle body case 102 with the first height 158 being less than the second height 160.

With renewed reference to FIG. 4, the throttle body assembly 100 may further include a fuel distribution sleeve 162 received in the throttle body case 102. The fuel distribution sleeve 162 may include an annular body 164 extending from a first sleeve end 166 to a second sleeve end 168 along a sleeve axis 170. The annular body 164 may have an inlet portion 172 proximate to the first sleeve end 166 and defining an inlet diameter 174. The annular body 164 may further have an outlet portion 176 proximate to the second sleeve end 168 and defining an outlet diameter 178. In the implementation of the fuel distribution sleeve 162 shown here, the inlet diameter 174 and the outlet diameter 178 may be equal. The annular body 164 may further have a throat portion 180 positioned between the inlet portion 172 and the outlet portion 176 and defining a throat diameter 182. As will be discussed below, the throat diameter 182 is less than the inlet diameter 174 and the outlet diameter 178.

The fuel distribution sleeve 162 can be received in the inlet side 104 of the throttle body case 102. The fuel distribution sleeve 162 is oriented with the first sleeve end 166 toward the inlet side 104 of the throttle body case 102 and the second sleeve end 168 toward the outlet side 106 of the throttle body case 102. In the most preferred embodiment, the second sleeve end 168 abuts the shelf 156. The fuel distribution sleeve 162 is inserted into the port 110 from the inlet side 104 of the throttle body case 102 until the second sleeve end 168 engages the shelf 156. The shelf 156, which is positioned above the throttle valve 116, supports the fuel distribution sleeve 162 above the throttle valve 116. As such, the fuel distribution sleeve 162 is arranged between a portion of the throttle valve 116 and the inlet side 104 of the throttle body case 102. Said differently, a portion of the throttle valve 116 is arranged between the fuel distribution sleeve 162 and the outlet side 106 of the throttle body case 102. Specifically (as shown), the shaft 118, which defines a pivot axis of the throttle valve 116, is arranged in this location. Also, all of or a portion of the throttle plate 120 will be arranged in this location depending on the rotation of the throttle valve 116.

Figure 10:
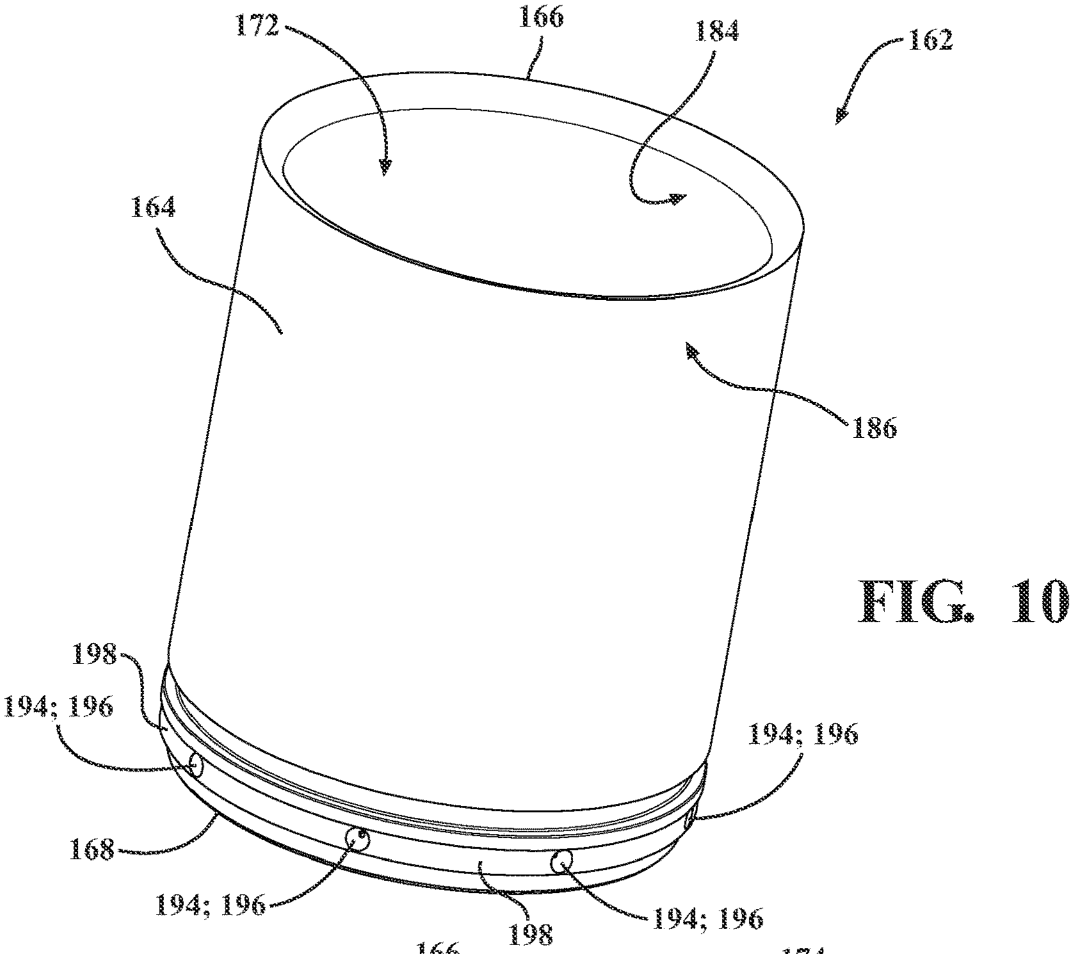
FIG. 10 is a perspective view of the fuel distribution sleeve.
Figure 11:
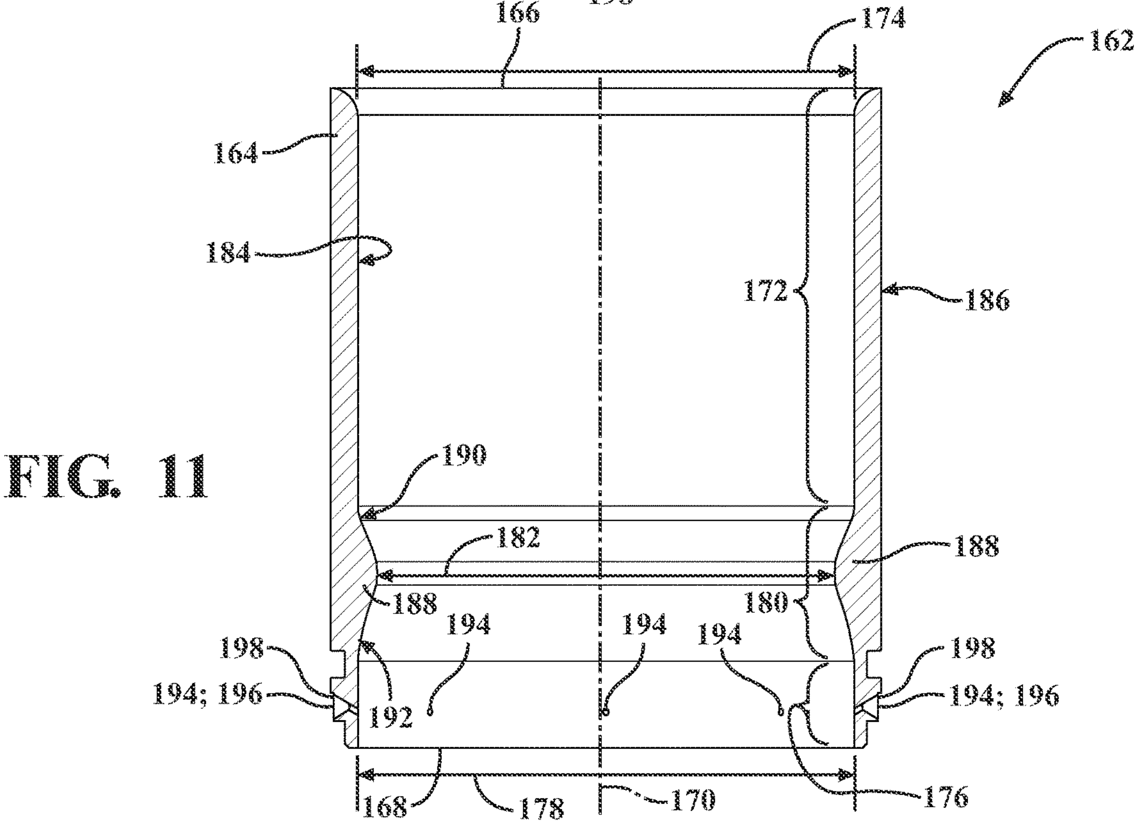
FIG. 11 is a cross-sectional view of the fuel distribution sleeve.
Figure 12:
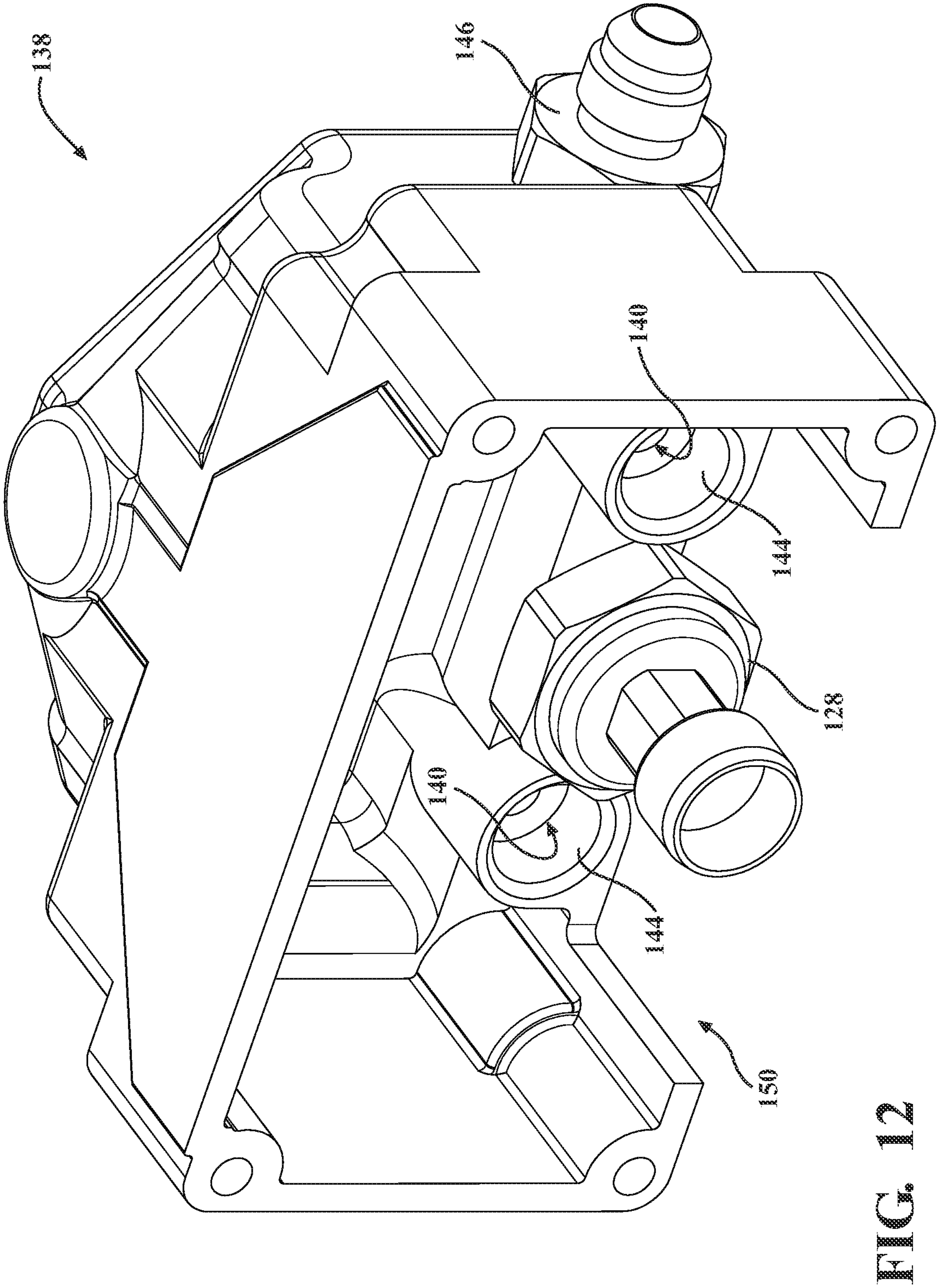
FIG. 12 is a perspective view of one of the injector covers.
Figure 13:
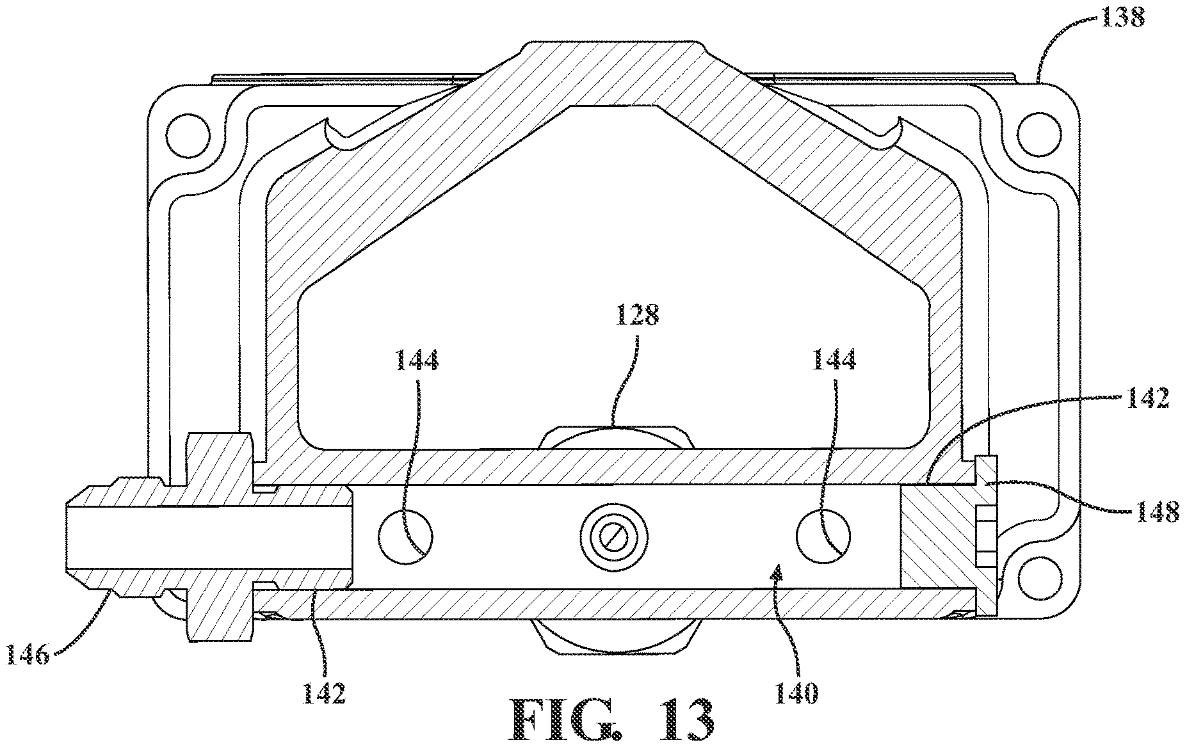
FIG. 13 is a cross-sectional view of the injector cover of FIG. 12.
Figure 14:
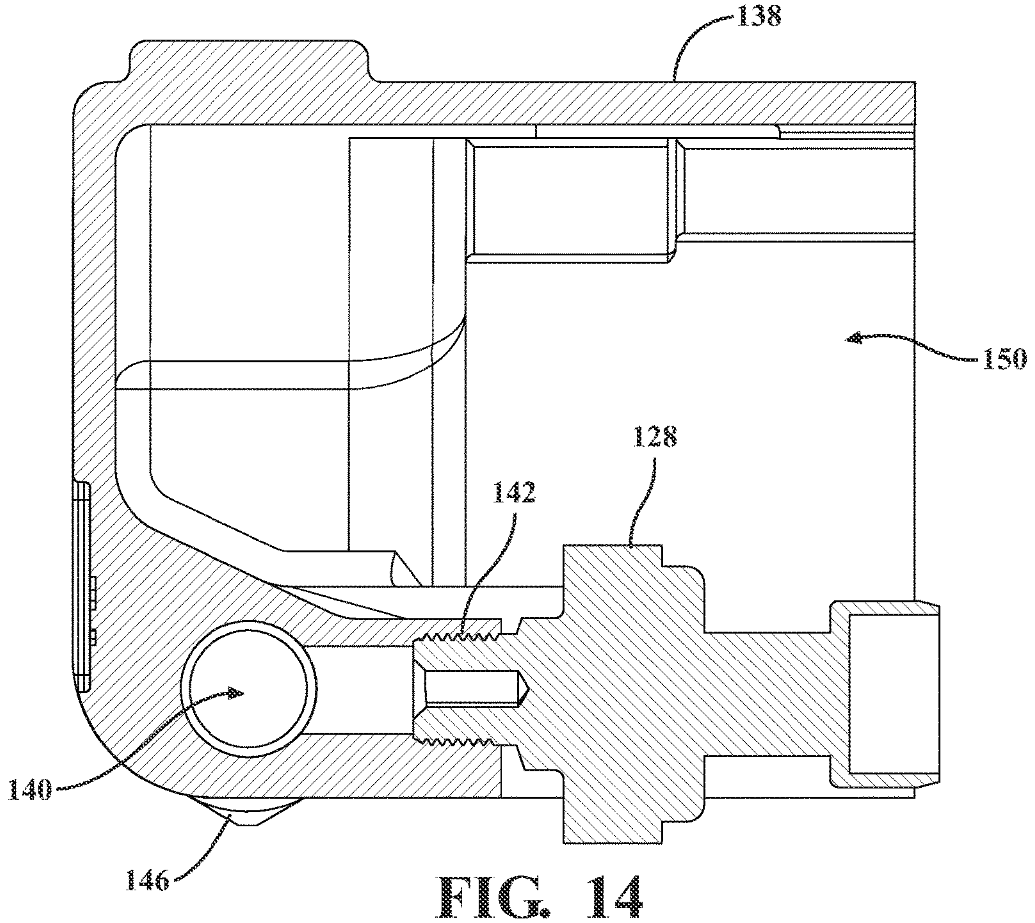
FIG. 14 is another cross-sectional view of the injector cover of FIG. 12.

As also shown in FIGS. 10 and 11, annular body 164 of the fuel distribution sleeve 162 includes an inner surface 184 and an outer surface 186. The outer surface 186 of the fuel distribution sleeve 162 can engage the inner surface 112 of the port 110 when the fuel distribution sleeve 162 is installed in the throttle body case 102. In the embodiment illustrated, there are a pair of grooves formed in the outer surface 186 of the sleeve 162. A corresponding o-ring 202 (shown best in FIGS. 5, 7, and 8) is disposed in each of the grooves formed in the outer surface 186. The o-rings 202 engage the inner surface 112 of the port 110 when the sleeve 162 is installed.

The inner surface 184 of the annular body 164 defines the inlet portion 172, the outlet portion 176, and the throat portion 180. The throat portion 180 may be formed by a raised wall 188 arranged on the inner surface 184 of the annular body 164. The raised wall 188 may be implemented as a region of the annular body 164 having a greater thickness in the throat portion 180 than the thickness at the inlet portion 172 or the outlet portion 176. In other implementations of the fuel distribution sleeve 162, the annular body 164 may have a uniform thickness and the raised wall 188 may be formed by deforming the annular body 164 such that a depression is defined on the outer surface 186 of the annular body 164 corresponding to the raised wall 188. As shown, the throat portion 180 is integrally formed with the annual body 164, but it is contemplated that the throat portion 180 could be separately formed and mounted to the annular body 164.

Referring to FIG. 11 specifically, the raised wall 188 has an axial profile corresponding to the sleeve axis 170. The axial profile may define an upper radius 190, which may define a transition between the inlet portion 172 and the throat portion 180 of the fuel distribution sleeve 162. The axial profile may further define a lower radius 192, which may define a transition between the throat portion 180 and the outlet portion 176 of the fuel distribution sleeve 162. The implementation of the fuel distribution sleeve 162 illustrated herein has an axial profile in which the upper radius 190 is less than the lower radius 192. In other implementations the upper radius 109 and the lower radius 192 may be equal to one another and the axial profile may be symmetrical (i.e., the area of the throat portion 180 that is adjacent to the inlet portion 172 may have the same shape as the area of the throat portion 180 that is adjacent to the outlet portion 176).

Figure 9:
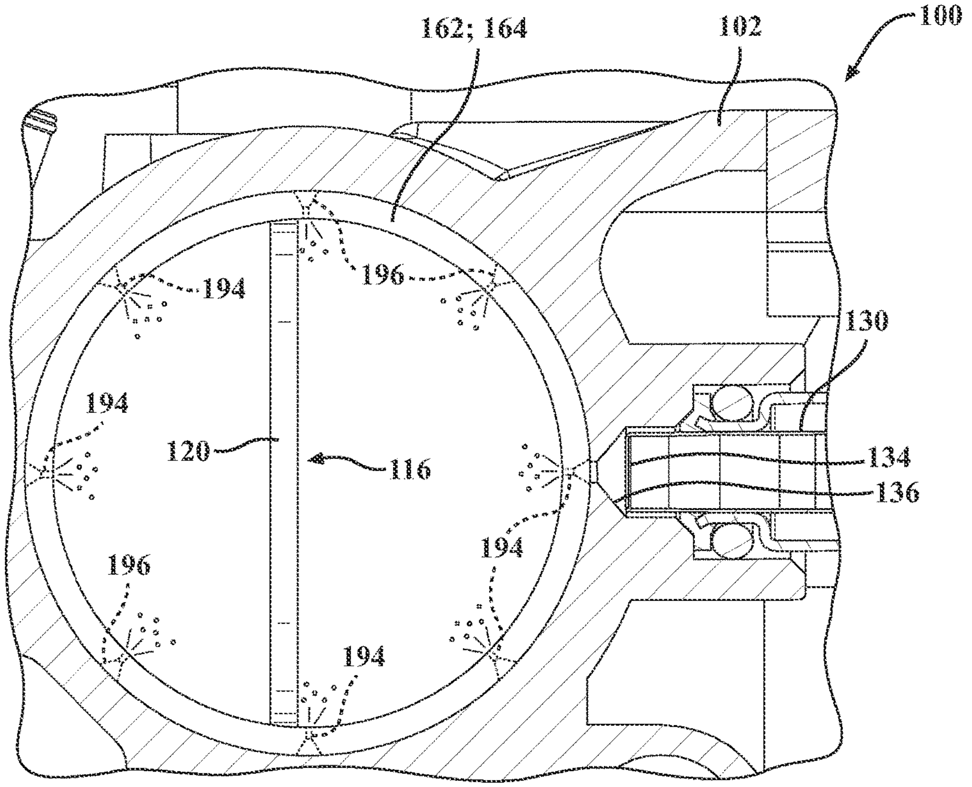
FIG. 9 is an enlarged cross-sectional view of a portion of the fuel injection throttle body assembly of FIG. 6 shown with the throttle valve in a fully open position.

The fuel distribution sleeve 162 may further include a plurality of fuel nozzles 194 defined in the annular body 164 and radially arranged proximate to the second sleeve end 168. The plurality of fuel nozzles 194 are radially arranged about the sleeve axis 170 and, as illustrated herein and particularly in FIG. 9, may be equally spaced at even angular intervals. Here, the fuel distribution sleeve 162 defines eight fuel nozzles 194, however some implementations may define more than eight (e.g., ten, twelve, fourteen, etc.) fuel nozzles, and other implementations may define fewer than eight (e.g., seven, six, five, etc.) fuel nozzles. The fuel nozzles 194 extend from the outer surface 186 of the annular body 164 to the inner surface 184 of the annular body 164 and are in fluid communication with the fuel injector 130 and allow fuel to be sprayed into the port 110 and mixed with air to power the internal combustion engine 50.

Turning to FIGS. 7, 8, and 11, the plurality of fuel nozzles 194 are arranged between the throat portion 180 of the annular body 164 and the second sleeve end 168. Said differently, the plurality of fuel nozzles 194 are arranged in the outlet portion 176 of the annular body 164. In other words, the plurality of fuel nozzles 194 are arranged between the throat portion 180 of the annular body 164 and the throttle valve 116. This arrangement of the fuel distribution sleeve 162 places the fuel nozzles 194 downstream of, or further along the path of, incoming air than the throat portion 180 of the annular body 164. As will be discussed below, the flow characteristics of the incoming air in the outlet portion 176 of the annular body 164 facilitate improved atomization of the fuel and mixing with the incoming air.

Each of the plurality of fuel nozzles 194 may have a tapered opening 196 defined in the outer surface 186 of the annular body 164 of the fuel distribution sleeve 162. The tapered opening 196 facilitates the flow of fuel into the fuel nozzles 194 during operation. Best shown in FIG. 8, a portion of each of the plurality of fuel nozzles 194 may be non-perpendicular to the sleeve axis 170. Each of the fuel nozzles 194 extends though the annular body 164 along an axis, which may intersect with the sleeve axis 170 at an angle that is not perpendicular. Said differently, each of the fuel nozzles 194 directs fuel toward a point that is downstream of, or further along, the path of incoming air than the fuel nozzles 194. Or in other words, the point where each of the fuel nozzles 194 is angled is downstream of, or further along the path of, incoming air than the throat portion 180 of the annular body 164. Each of the plurality of fuel nozzles 194 are angled away from the throat portion 180 of the annular body 164. As with above, aiming the fuel nozzles 194 away from the throat portion 180 and toward the internal combustion engine 50 facilitates improved atomization of the fuel and mixing with the incoming air.

The fuel distribution sleeve 162 may further include a channel 198 defined on the outer surface 186 of the annular body 164. The channel 198 is in fluid communication with the plurality of fuel nozzles 194 to supply each of the fuel nozzles 194 with fuel injected by the fuel injector 130. The fuel is supplied ahead of the shaft 118 and pivot axis of the throttle valve 116 in the configuration shown. The channel 198 is defined by a section of the outer surface 186 with a reduced diameter that cooperates with the inner surface 112 of the port 110 to form an annular void around the fuel distribution sleeve 162 and around each of the fuel nozzles 194 to fluidly connect each of the fuel nozzles 194. The depth of the channel 198 can be of any suitable degree sufficient enough to permit the flow of fuel to all of the fuel nozzles 194. In the embodiment illustrated, the channel 198 is relatively shallow and is formed between the grooves housing the o-rings 202. The o-rings 202, in particular the o-ring 202 adjacent the second sleeve end 168, acts to provide a seal for the channel 198 and the fuel passing therethrough. The fuel passage 136 defined in the inner surface 112 of the port 110 is in fluid communication with the channel 198 to facilitate fuel that has been supplied by the fuel injector 130 can flow through the fuel passage 136 and into the channel 198. Subsequently, fuel flowing out of the fuel passage 136 flows through the channel 198 and around the annular body 164 of the fuel distribution sleeve 162 and into the tapered opening 196 of each of the fuel nozzles 194. In some implementations of the throttle body assembly 100, the channel 198 may be defined on the inner surface 112 of the port 110. Said differently, the channel 198 may be defined by a section of the inner surface 112 of the port 110 with an increased diameter that cooperates with the outer surface 186 of the annular body 164 to form the annular void around the fuel distribution sleeve 162. Other implementations of the fuel distribution sleeve 162 and a channel 198 defined in both the inner surface 112 of the annular body 164 and the outer surface 186 of the annular body 164 are contemplated.

With renewed reference to FIG. 7, air flowing through the throttle body assembly 100 from the inlet side 104 to the outlet side 106 of the throttle body case 102 is schematically illustrated. The air flow is illustrated as stream lines 200, which illustrate characteristics of the air as it flows through the port 110 and the fuel distribution sleeve 162. As mentioned above, air flowing through the port 110 enters the first sleeve end 166 of the fuel distribution sleeve 162 and exits the second sleeve end 168 of the fuel distribution sleeve 162. Said differently, air flows from the inlet portion 172, through the throat portion 180, and to the outlet portion 176 before finally passing through the throttle valve 116.

As shown by the stream lines 200, air flow in the inlet portion of the annular body 164 is evenly distributed across the inlet diameter 174. In other words, air pressure and speed are generally uniform as distance from the sleeve axis 170 increases (i.e., from the center of the fuel distribution sleeve 162 to the inner surface 184). As the air enters the throat portion 180 of the annular body 164, the cross-sectional area of the fuel distribution sleeve 162 is reduced. The stream lines 200 closest to the inner surface 184 are forced around the raised wall 188 toward the sleeve axis 170, which increases the speed of the air flow. Because the raised wall 188 is affecting the flow of the air, the air pressure and speed are less uniform as the air flows through the throat portion 180. Air exits the throat portion 180 and enters the outlet portion 176, which increases in diameter. The stream lines 200 illustrate how the air flow accelerated by the throat portion 180 is pulled toward the inner surface 184 of the annular body 164 disrupting a boundary layer that may have formed adjacent to the inner surface 184 in the inlet portion 172. The stream lines 200 show how the air is pulled toward the fuel nozzles 194 as the air exits the throat portion 180. Because the flow of air is very close to the inner surface 184 as it flows past the fuel nozzles 194 fuel flowing out of the nozzles is more readily atomized and swept into the air flow to mix with the air, which improves combustion and efficiency of the internal combustion engine 50, as described above. The improved flow prevents fuel from staying attached to the inner surface 184 of the annular body 164 and running down the fuel distribution sleeve 162 not mixing with the air and being combusted. Placing the fuel nozzles 194 in the outlet portion 176 downstream of the throat portion 180 facilitates improved mixing of the air and fuel resulting in a more uniform mixture being supplied to each of the cylinders for optimal combustion.

Several instances have been discussed in the foregoing description. However, the aspects discussed herein are not intended to be exhaustive or limit the disclosure to any particular form. Various modifications to these aspects will be readily apparent to those skilled in the art, and the generic principles defined herein may be applied to other aspects without departing from the scope of the disclosure. The terminology that has been used is intended to be in the nature of words of description rather than of limitation. Many modifications and variations are possible in light of the above teachings and the disclosure may be practiced otherwise than as specifically described.

What is claimed is:

1. A fuel injection throttle body assembly for an internal combustion engine, the fuel injection throttle body assembly comprising:

- a throttle body case having an inlet side and an outlet side and defining a port having an inner surface extending from said inlet side to said outlet side, wherein said inlet side is configured to receive air and said outlet side is configured to be coupled to the internal combustion engine;
- a fuel distribution sleeve disposed in said port and comprising:
  - an annular body extending from a first sleeve end to a second sleeve end and having an inlet portion proximate said first sleeve end defining an inlet diameter, and an outlet portion proximate said second sleeve end defining an outlet diameter, said annular body further having a throat portion positioned between said inlet portion and said outlet portion defining a throat diameter, wherein said throat diameter is less than said inlet diameter and said outlet diameter; and
  - a plurality of fuel nozzles defined in said annular body and radially arranged proximate said second sleeve end; and
- a throttle valve pivotably supported by said throttle body case and disposed in said port, wherein a portion of said throttle valve is arranged between said fuel distribution sleeve and said outlet side of said throttle body case.

2. The fuel injection throttle body assembly of claim 1, wherein said port includes a shelf that defines a first port diameter proximate said inlet side and a second port diameter proximate said outlet side, and wherein said first port diameter is greater than said second port diameter.

3. The fuel injection throttle body assembly of claim 2, wherein said fuel distribution sleeve is received in said inlet side of said throttle body case with said second sleeve end abutting said shelf.

4. The fuel injection throttle body assembly of claim 2, wherein said shelf is arranged in said port between said throttle valve and said inlet side of said throttle body case.

5. The fuel injection throttle body assembly of claim 1, wherein said fuel distribution sleeve further comprises a channel defined on an outer surface of said annular body, and wherein said channel is in fluid communication with said plurality of fuel nozzles.

6. The fuel injection throttle body assembly of claim 5, wherein said inner surface of said port defines a fuel passage in fluid communication with said channel, and further comprising a fuel injector coupled to said throttle body case and in fluid communication with said fuel passage.

7. The fuel injection throttle body assembly of claim 1, wherein said annular body comprises an inner surface and an outer surface and said throat portion is formed by a raised wall arranged on said inner surface.

8. The fuel injection throttle body assembly of claim 7, wherein said raised wall has an axial profile defining an upper radius and a lower radius.

9. The fuel injection throttle body assembly of claim 8, wherein said upper radius of said raised wall is less than said lower radius of said raised wall.

10. The fuel injection throttle body assembly of claim 1, wherein said throttle valve has a pivot axis with said pivot axis arranged between said fuel distribution sleeve and said outlet side of said throttle body case.

11. The fuel injection throttle body assembly of claim 1, wherein said plurality of fuel nozzles is arranged between said throat portion of said annular body and said second sleeve end.

12. The fuel injection throttle body assembly of claim 1, wherein said throttle valve has a pivot axis, and wherein said plurality of fuel nozzles is arranged between said throat portion of said annular body and said pivot axis of said throttle valve.

13. The fuel injection throttle body assembly of claim 1, wherein said plurality of fuel nozzles is arranged in said outlet portion of said annular body.

14. The fuel injection throttle body assembly of claim 1, wherein said fuel distribution sleeve defines a sleeve axis and each of said plurality of fuel nozzles are non-perpendicular to said sleeve axis.

15. The fuel injection throttle body assembly of claim 14, wherein each of said plurality of fuel nozzles are angled away from said throat portion.

16. The fuel injection throttle body assembly of claim 1, wherein each of said plurality of fuel nozzles has a tapered opening defined in an outer surface of said annular body of said fuel distribution sleeve.

17. The fuel injection throttle body assembly of claim 1, wherein said inlet diameter of said first sleeve end of said annular body and said outlet diameter of said second sleeve end of said annular body are equal.

18. The fuel injection throttle body assembly of claim 1, wherein said throttle body case defines four ports each having an inner surface.

19. The fuel injection throttle body assembly of claim 18, wherein each of said four ports defines a port diameter, and said port diameters of each port are equal.

20. A fuel distribution sleeve for use in a throttle body assembly and configured to supply fuel ahead of a pivot axis of a throttle valve, the fuel distribution sleeve comprising:

- an annular body extending from a first sleeve end to a second sleeve end and having an inlet portion proximate said first sleeve end defining an inlet diameter, and an outlet portion proximate said second sleeve end defining an outlet diameter, said annular body further having a throat portion positioned between said inlet portion and said outlet portion defining a throat diameter, wherein said throat diameter is less than said inlet diameter and said outlet diameter; and a plurality of fuel nozzles defined in said outlet portion of said annular body spaced from said throat portion with said plurality of fuel nozzles radially arranged proximate said second sleeve end.

21. The fuel distribution sleeve of claim 20, further comprising a channel defined on an outer surface of said annular body, and wherein said channel is in fluid communication with said plurality of fuel nozzles.

22. The fuel distribution sleeve of claim 20, wherein said annular body comprises an inner surface and an outer surface and said throat portion is formed by a raised wall arranged on said inner surface.

23. The fuel distribution sleeve of claim 22, wherein said raised wall has an axial profile defining an upper radius and a lower radius.

24. The fuel distribution sleeve of claim 23, wherein said upper radius of said raised wall is less than said lower radius of said raised wall.

25. The fuel distribution sleeve of claim 20, wherein each of said plurality of fuel nozzles has a tapered opening defined in an outer surface of said annular body of said fuel distribution sleeve.

* * * * *